Oct. 31, 1939.  J. W. HEMPHILL  2,178,204

PICK-UP AND STRIPPING DEVICE FOR HARVESTERS

Filed March 18, 1938  2 Sheets-Sheet 1

INVENTOR.
James W. Hemphill
BY
ATTORNEY.

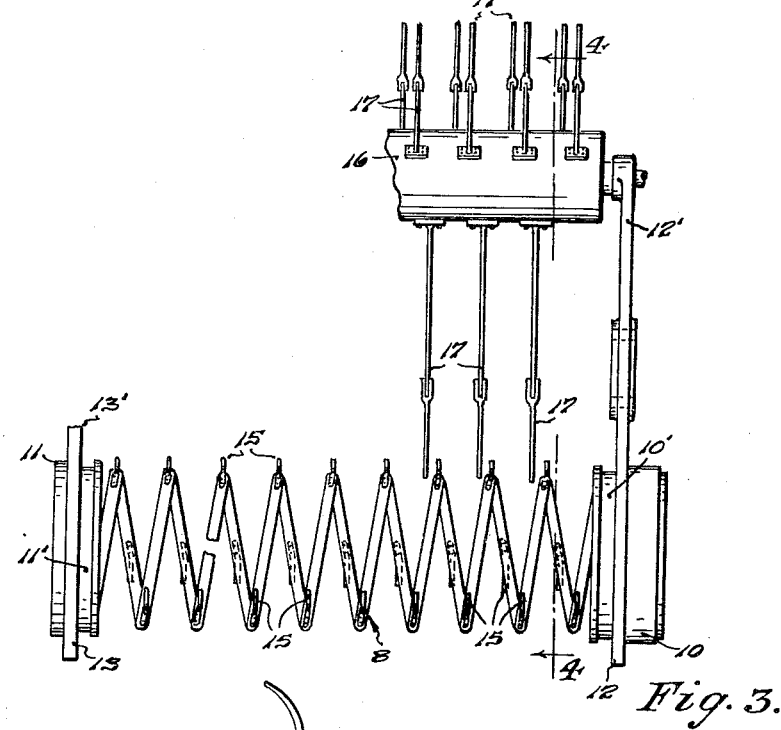
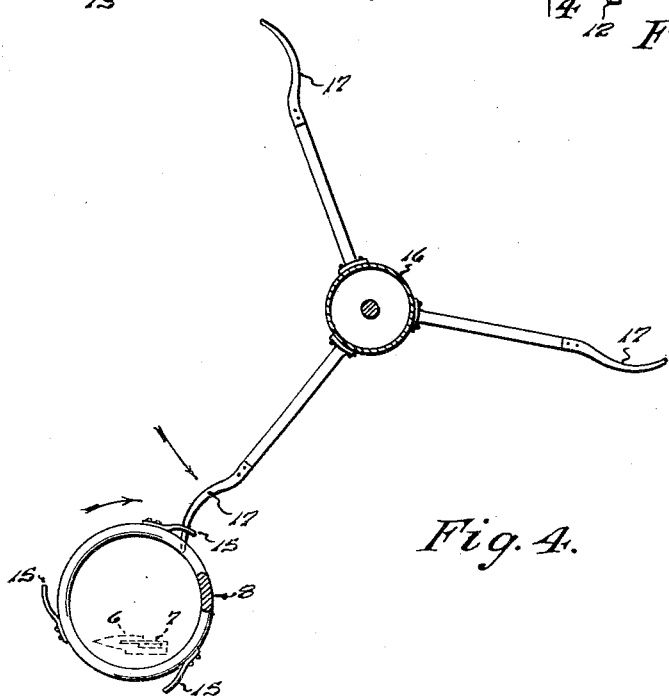

Patented Oct. 31, 1939

2,178,204

UNITED STATES PATENT OFFICE 2,178,204

PICK-UP AND STRIPPING DEVICE FOR HARVESTERS

James Wallace Hemphill, Friday Harbor, Wash.

Application March 18, 1938, Serial No. 196,680

5 Claims. (Cl. 56—219)

This invention relates to improvements in pick-up and stripping devices for harvesters. To clarify my present advancements it may be here stated that a pick-up attachment has been heretofore proposed which comprised a connected series of driven hoops surrounding the cutter blades in transversely spaced relation to one another and provided about their respective peripheries with circumferentially-spaced pick-up fingers acting to lift trampled cereal grasses into a position at which the cutters can remove the grain. Connecting the several hoops are peripherally disposed transverse rods and it is these rods which constitute the principal objection to the described structure due to the fact that the same bend the upright grasses in their revoluble travel about the cutter blades.

The present invention provides structure operative to overcome the above objection and additionally provides associated stripping mechanism acting to most effectively remove the cereal grasses from the pick-up fingers following their travel into cutting relation to the cutter blades.

Other features of the invention are hereinafter particularly described and set forth in the claims.

In order that the said invention may be clearly understood an exemplification thereof will be hereinafter fully described with reference to the accompanying drawings, in which Figure 1 is a fragmentary side elevational view of one embodiment of my invention shown as attached to the nose of a harvester.

Fig. 3 is a somewhat schematic partial-plan view of the associated pick-up and stripping devices shown in the preceding views, the figure being taken to a reduced scale; and Fig. 4 is a longitudinal vertical section taken on the line 4—4 of Fig. 3.

Figure 2:
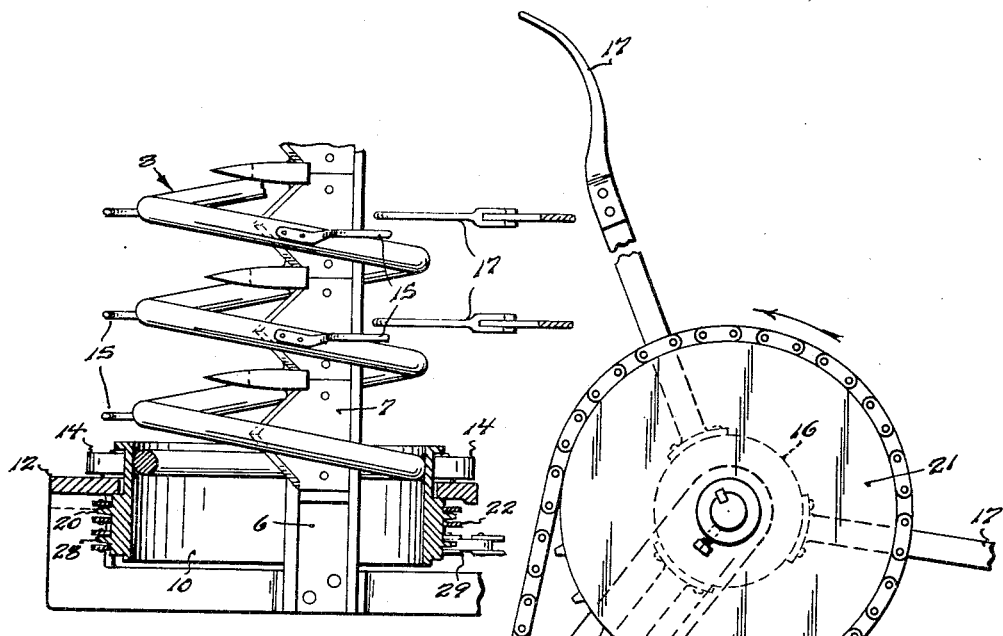
Fig. 2 is a fragmentary horizontal section thereof with parts shown in plan.
Figure 1:
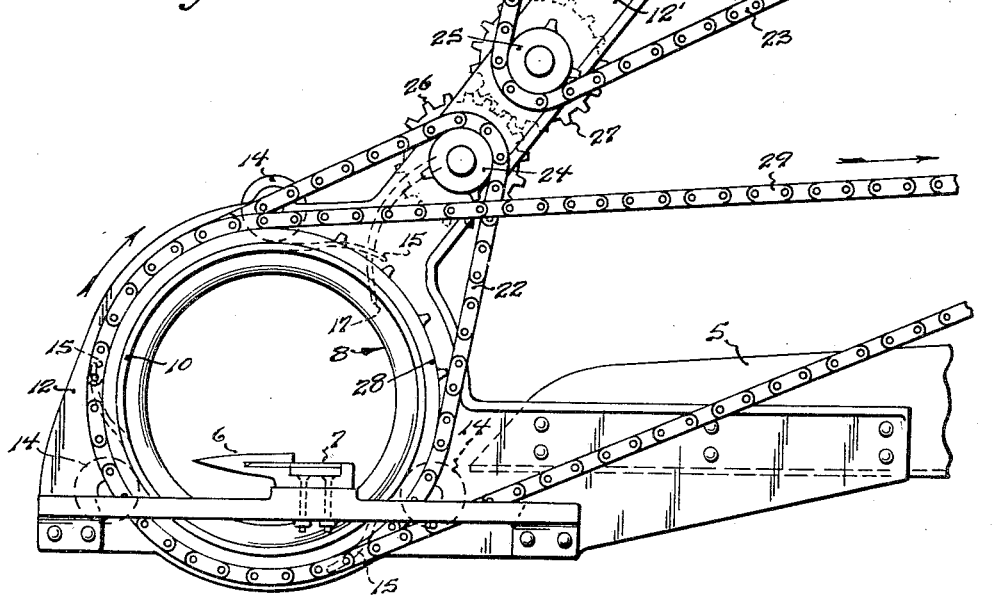

The numeral 5 in the drawings represents the harvester frame from which is carried the grain-cutting shear members comprised of a stationary blade 6 and a movable blade 7, the drive means therefor not being shown.

According to the present invention I provide, in surrounding relation to said shears, a cage generally denoted by 8 and which is formed in the shape of a helix with the coils thereof inflexible and terminating at the two ends in integral bearing rings 10 and 11, the rings fitting annular openings provided by frame members 12 and 13 constituting extensions of the harvester frame 5. Said bearing rings, in more particularity, are formed with external channelways 10' and 11' and tracking in these ways for revolubly supporting the cage are frame-journaled rollers 14. At spaced intervals of the length of the cage coils and fixed to the latter to project externally therefrom are a multiplicity of pick-up fingers designated by 15, these fingers being desirably in the form of hooks with the bills thereof disposed directively of the revoluble course of the cage and lying parallel or approximately parallel with the perimeter of the latter.

In association with said pick-up fingers and revolubly supported in frame elements 12' and 13' to locate its axis parallel with the axis of revolution of the cage and above and to the rear thereof is a cylinder 16 carrying about its periphery a helically disposed series of stripping arms 17. Said cylinder is revolubly driven in a direction opposite to that of the cage and, as indicated in Fig. 3, has its arms positioned in registering relation to the fingers such that the stripping tips operate medially between the fingers in the interstices between the convolutions of the cage helix. Using an arm length exceeding the radius of the fingers, I am permitted to drive the cage and the cylinder 16 at a uniform speed and obtain a rate of motion of the arms at the outer limits thereof greater than the speed of the fingers, the timing being such that the stripping tips of the arms pass the fingers slightly in advance of the traversal, by said fingers, of a radial line common to both the cylinder and the cage.

As a drive arrangement for my pick-up and stripping devices I provide sprocket wheels 20 and 21 fixedly associated with the cage and with the cylinder, respectively, and passing about these sprocket wheels employ chains 22 and 23 which pass over intermediate sprocket wheels 24 and 25 the supporting shafts for which carry intermeshing spur gears 26 and 27. Complementing the driving sprocket wheel 20 is a sprocket wheel 28 suitably driven from a drive chain 29.

It is obvious that numerous structural modifications might be resorted to without departing from the broad state of the advance in the art and I therefore intend that the hereto annexed claims, in the construction given the language employed, be broadly interpreted to a degree commensurate with the state of the advance in the art.

What I claim is:

1. A pick-up device for use with the cutter of a harvester and comprising the combination of the cutter, a cage formed in the shape of a helix with the coils thereof inflexible and provided at spaced intervals of the length with externally projecting pick-up fingers, a revoluble mounting for the cage locating the cage in surrounding relation to the cutter, and means for driving the cage for operating the fingers revolubly to have the fingers carry the work upwardly and thence rearwardly into cutting relation to the cutter.

2. A pick-up device for use with the cutter of a harvester and comprising the combination of the cutter, a cage formed in the shape of a helix and provided about the perimeter with pick-up fingers, a revoluble mounting for the cage locating the cage in surrounding relation to the cutter, and means for driving the cage for operating the fingers revolubly to have the fingers carry the work upwardly and thence rearwardly into cutting relation to the cutter.

3. A pick-up and stripping device for use with the cutter of a harvester and comprising the combination of the cutter, a helical cage carrying about its periphery a plurality of pick-up fingers arranged to engage the work, a revoluble mounting for said cage locating the cage in surrounding relation to the cutter, means for driving the cage to carry the work engaged by said fingers into cutting relation to the cutter, and means also driven by said drive means and adapted to register with the pick-up fingers for stripping the work from the fingers following the cutting.

4. A pick-up and stripping device for use with the cutter of a harvester and comprising the combination of the cutter, a cage formed in the shape of a helix with the coils thereof relatively inflexible and provided at spaced intervals of the length with externally projecting pick-up fingers, a revoluble mounting for said cage locating the cage in surrounding relation to the cutter, an arbor carrying a series of projecting arms related to the pick-up fingers of the cage, a revoluble mounting for said arbor locating the arbor above and to the rear of the cage in position whereat the revoluble travel of the arbor passes the arms between the coils of the cage for stripping the work from the pickup fingers, and drive means common to both the cage and the arbor operating to impart opposite directive rotation thereto.

5. A pick-up and stripping device for use with the cutter of a harvester and comprising the combination of the cutter, a cage formed in the shape of a helix with the coils thereof relatively inflexible and supporting about the periphery a multiplicity of pick-up fingers, a revoluble mounting for said cage locating the cage in surrounding relation to the cutter, an arbor carrying a series of stripping arms describing a helix paralleling, in an opposite direction of generation, the generated helix of the cage, a revoluble mounting for said arbor locating the arbor parallel to the axis of the cage in a position above and to the rear of the cage such that the stripping arms extend into the interstices between the coils of the cage, means for driving the cage revolubly to have the fingers carry the work upwardly and thence rearwardly into cutting relation to the cutter, and a drive take-off from the cage for driving the arbor revolubly in a direction opposite to the direction of revolution of the cage.

JAMES WALLACE HEMPHILL.